(12) United States Patent
Zhou et al.

(10) Patent No.: US 9,971,367 B2
(45) Date of Patent: May 15, 2018

(54) VOLTAGE-DEVIATION DETECTING AND ADJUSTING SYSTEM FOR BALANCE MODULE OF BATTERY

(71) Applicant: Hangzhou Xieneng Technology Co.,LTD., Hangzhou (CN)

(72) Inventors: Xunwei Zhou, Hangzhou (CN); Dashou Hua, Hangzhou (CN); Danji Xi, Hangzhou (CN); Liqin Wang, Hangzhou (CN)

(73) Assignee: Hangzhou Xieneng Technology CO., LTD. (CN)

( * ) Notice: Subject to any disclaimer, the term of this patent is extended or adjusted under 35 U.S.C. 154(b) by 0 days. days.

(21) Appl. No.: 15/629,637

(22) PCT Filed: Dec. 25, 2015

(86) PCT No.: PCT/CN2015/099016
§ 371 (c)(1),
(2) Date: Jun. 21, 2017

(87) PCT Pub. No.: WO2016/101918
PCT Pub. Date: Jun. 30, 2016

(65) Prior Publication Data
US 2018/0039294 A1 Feb. 8, 2018

(30) Foreign Application Priority Data

Dec. 25, 2014 (CN) .......................... 2014 1 0822298

(51) Int. Cl.
*G05F 1/46* (2006.01)
*H02J 7/00* (2006.01)
(Continued)

(52) U.S. Cl.
CPC .......... *G05F 1/46* (2013.01); *H01M 10/4285* (2013.01); *H02J 7/0014* (2013.01);
(Continued)

(58) Field of Classification Search
CPC ... G05F 1/46; H02J 7/0014; H02J 7/04; H02J 7/042; H02J 7/045; H02J 7/0065;
(Continued)

(56) References Cited

U.S. PATENT DOCUMENTS 6,268,710 B1 * 7/2001 Koga ................. G01R 31/3624
320/116
6,992,463 B2 * 1/2006 Yoshio .................. H02J 7/0031
320/134
(Continued)

FOREIGN PATENT DOCUMENTS

CN        102593893      *  2/2012
CN        104282931 A       1/2015
(Continued)

*Primary Examiner* — Kyle J Moody
*Assistant Examiner* — Demetries A Gibson
(74) *Attorney, Agent, or Firm* — James M. Wu; JW Law Group

(57) ABSTRACT

Disclosed a voltage-deviation detecting and adjusting system for a balance module of a battery. The voltage-deviation detecting and adjusting system comprises the balance module being adjusted and connected to a main control board which automatically adjusts voltage deviation of an output voltage adjusting from the balance module; a direct-current programmable power supply for supplying power is further connected to the main control board, the main control board comprises a single-chip microcontroller, the single-chip microcontroller is connected with a voltage sampling module which is for obtaining an input voltage and an output voltage of the balance module by sampling and then outputting the input voltage and the output voltage to the single-chip microcontroller, and a voltage adjusting module for adjusting the output voltage of the balance module after receipt of an acquired signal of a voltage deviation value, wherein, after comparing the input voltage and the output voltage of the balance module sampled by the voltage (Continued)

sampling module, the single-chip microcontroller outputs the signal of the voltage deviation value to the voltage adjusting module, and the voltage adjusting module adjusts the output voltage of the balance module to be consistent with the input tape of the balance module in accordance with the voltage deviation value.

6 Claims, 3 Drawing Sheets

(51) Int. Cl.
    *H01M 10/42*     (2006.01)
    *H02M 1/00*     (2006.01)
    *H02J 7/04*     (2006.01)

(52) U.S. Cl.
    CPC .... *H01M 2010/4271* (2013.01); *H02J 7/0065* (2013.01); *H02J 7/042* (2013.01); *H02J 7/045* (2013.01); *H02J 2007/0067* (2013.01); *H02M 2001/0016* (2013.01)

(58) Field of Classification Search
    CPC ............. H02J 2007/0067; H02J 7/007; H01M 10/4285; H01M 2010/4271; H02M 2001/0016

See application file for complete search history.

(56) References Cited

U.S. PATENT DOCUMENTS

| | | | | |
|---|---|---|---|---|
| 8,248,258 B2 * | 8/2012 | Tseng | ................... | G06F 1/3203 |
| | | | | 324/76.11 |
| 2010/0253285 A1 * | 10/2010 | Takahashi | ............. | H02J 7/0006 |
| | | | | 320/118 |
| 2014/0015454 A1 * | 1/2014 | Kunimitsu | ........ | H01M 10/4257 |
| | | | | 318/139 |
| 2014/0035360 A1 * | 2/2014 | Butzmann | ........... | H01M 10/425 |
| | | | | 307/10.1 |
| 2014/0152261 A1 * | 6/2014 | Yamauchi | ........... | B60L 11/1866 |
| | | | | 320/118 |
| 2016/0059712 A1 * | 3/2016 | Jang | ........................ | B60L 11/18 |
| | | | | 307/10.1 |

FOREIGN PATENT DOCUMENTS

| | | |
|---|---|---|
| CN | 104407302 A | 3/2015 |
| CN | 204389602 U | 6/2015 |

\* cited by examiner

VOLTAGE-DEVIATION DETECTING AND ADJUSTING SYSTEM FOR BALANCE MODULE OF BATTERY

CROSS-REFERENCE TO RELATED APPLICATION

This application claims the benefit of Chinese Patent Application No. 201410822298.4, filed on Dec. 25, 2014, which is incorporated herein by reference in its entirety.

FIELD OF THE DISCLOSURE

The disclosure relates to a voltage-deviation detecting and adjusting system for a balance module of a battery.

BACKGROUND OF THE DISCLOSURE

With rapid development of the economics and continuous improvement of living standard, the demand for energy continuously increases. The conventional energy leads two major problems to the society: one of the problems is about the energy crisis, that is, the conventional energy is being reduced continuously and will finally close to exhaustion; the other is about the environment pollution, that is, the environmental damage caused by the conventional energy is becoming more and more serious. Accordingly, new types of energy are needed to supplement the human energy structure and to maintain a long-term sustainable development. A lithium battery gains the focus of attention because of its unique advantages, especially for the application in an electronic vehicle. It has been widely accepted in the industry to use a lithium battery as a power supply of the whole vehicle. In order to obtain a required voltage and current, a large number of the lithium batteries are often required to be connected in series and in parallel as a whole battery pack, but there are big differences between the respective lithium batteries, and the differences between the respective batteries will greatly shorten the battery life and cycle period when the whole battery pack is charged and discharged. Just due to this situation, balancing the batteries is particularly important, however, the effect of battery balance is directly affected by the consistency of the voltage deviation of the battery balance module itself, so it is necessary to automatically detect the batteries' differences and adjust the corresponding voltage deviation.

In the prior technical scheme, a method and a device for automatic balance and adjustment are provided for a battery pack having a plurality of rechargeable batteries in series. The device is composed of a DC/DC converter which has input terminals being connected to the positive terminal and the negative terminal of the battery pack, and the N groups of the same DC output terminals being respectively connected to the negative electrodes and the positive electrodes of the corresponding N batteries. As a result, when the high-frequency pulse generator starts, the converter can perform power distribution based on the battery voltages of the respective batteries, so that the electric power is transferred from high-capacity batteries to low-capacity batteries, which makes the battery voltages and electric power of the respective batteries consistent so as to reach the balance of the batteries. The automatic balance and adjustment method can prevent the battery pack from overcharge and over-discharge in the charge and discharge processes, so that the battery pack is protected and the service life of the battery pack is extended. However, this scheme is quite theoretical, and the implementation of this scheme is very difficult and expensive. The balance module also has the following disadvantages. The conventional voltage deviation detection and adjustment methods mainly adjust a chip-level voltage bias, but when a chip is used for the module, the adjusted voltage bias will produce a new voltage error due to the impact of external circuits. Although the new voltage error is not great in general situations, the battery balance needs high precision of the voltage, especially the batteries whose platform voltage are relatively flat, such as a lithium iron phosphate battery, needs to adjust voltage bias very precisely, so the voltage deviation adjustment is performed to improve the voltage precision after the balance module is arranged. If the voltage deviation is only adjusted in chip as well as before, the final products cannot have optimal voltage biases due to the impacts of the precision of the other components in the circuit, such as resistors, capacitors, which will make some of the final products unqualified and further lead to the reduction of the product yield. If such a product is applied to a battery, the voltage of the respective battery will be pulled to be a deviant value so that the service life of the whole box of batteries is influenced, and even the batteries may be damaged which will cause the system unusable and worse than that without the balance module. Besides, it is difficult for the conventional voltage bias adjustment to make statistics on the final test results of the module, which is unfavorable for upgrades and developments of the products. And the voltage adjustment process is irreversible, that means the module is fixed after the adjustment is done, which is likely to cause damage and waste of the module.

SUMMARY OF THE DISCLOSURE

The disclosure provides a voltage-deviation detecting and adjusting system for a balance module of a battery, which has advantages of simple and understandable operation, high-speed adjustment, good effects and has the abilities to improve the outgoing quality and the effect of battery balance and to extend the service life of battery.

The scheme according to the disclosure is described as follows.

The voltage-deviation detecting and adjusting system comprises an adjusted balance module and connected to a main control board which automatically adjusts voltage deviation of an output voltage adjusting from the balance module, a direct-current programmable power supply for supplying power is further connected on the main control board, the main control board comprises a single-chip microcontroller connected with a voltage sampling module which is for obtaining an input voltage and an output voltage of the balance module by sampling and then outputting the input voltage and the output voltage to the single-chip microcontroller, and a voltage adjusting module which is for adjusting the output voltage of the balance module after receipt of an acquired signal of a voltage deviation value, wherein, after comparing the input voltage and the output voltage of the balance module sampled by the voltage sampling module, the single-chip microcontroller outputs the signal of the voltage deviation value to the voltage adjusting module, and the voltage adjusting module adjusts the output voltage of the balance module to be consistent with the input voltage of the balance module in accordance with the voltage deviation value.

The balance module according to the disclosure has two operation manners, including an upward power transmission manner and a downward power transmission manner. The balance module mainly balances battery voltages of an upper battery unit and a lower battery unit, when the battery voltage of the upper battery unit is greater than the battery voltage of the lower battery unit, the balance module operates under the downward power transmission manner, when the battery voltage of the lower battery unit is greater than the voltage of the upper battery unit, the balance module operates under the upward power transmission manner. And the main control board samples the voltages of the balance module under different operation manners, then the voltage deviation value is obtained by using corresponding calculation methods, and then the output voltage of the balance module is adjusted in accordance with the voltage deviation value. In summary, the disclosure adjusts the output voltage of the balance module directly by using the main control board to make the output voltage consistent with the input voltage, so that the errors introduced by the peripheral circuits can be eliminated and the error of the final product is reduced with the precision of the components unchanged.

Further, the balance module is provided with a plurality of boost fuses connected in parallel, each of which is used for increasing the output voltage after blown out, and a plurality of buck fuses connected in parallel, each of which is used for reducing the output voltage after blown out. For example, if the input voltage and the output voltage of the balance module are equal to 3.30V and 3.34V respectively, the output voltage can be decreased to 3.28V by blowing out one of the plurality of the buck fuses in the balance module and then be increased to 3.30V by blowing out one of the plurality of boost fuses in the balance module. Each of the boost fuses corresponds to a different boost voltage value and each of the buck fuses corresponds to a different buck voltage value, both of which can be set based on the requirements.

Further, the voltage adjusting module comprises a voltage adjusting and controlling module which is connected to the single-chip microcontroller, the voltage adjusting and controlling module is connected to a voltage adjustment mode entering switch, a selector switch and a blowing switch, the voltage adjustment mode entering switch is controlled by the voltage adjusting and controlling module to enable an adjusting mode, the selector switch is controlled by the voltage adjusting and controlling module to select a responding boost fuse or a corresponding buck fuse according to the voltage deviation value, and the blowing switch is controlled by the voltage adjusting and controlling module to output a blowing out signal to the balance module for blowing out a corresponding fuse. After the voltage adjusting module receives the signal of the voltage deviation value from the single-chip microcontroller, the voltage adjusting and controlling module turns the voltage adjustment mode entering switch into an entry mode, and then one corresponding boost fuse or buck fuse is selected through the selector switch in accordance with the signal of the voltage deviation value, and finally the blowing switch outputs the blowing out signal to the balance module for blowing out the fuse selected by the selector switch, so that the voltage deviation adjustment of the balance module is realized.

Further, the main control board comprises a multi-channel power supply which is connected to the direct-current programmable power supply, the multi-channel power supply is respectively connected to the single-chip microcontroller, the voltage sampling module and the voltage adjusting module.

Further, the main control board further comprises a dial switch for selecting a type and one of the operation manners of the balance module, a plurality of indicating lamps for showing operation statuses of the main control board and a buzzer for alarming. Before the adjustment, the dial switch is used to select a type and one of the operation manners of the balance module. The indicating lamps are used to display the present operation status of the main control board. The indicating lamp for showing VCC status is on when power is supplied normally, the indicating lamp for showing READY status is on when all the components are ready before operation, the indicating lamp for showing BURNING status is on when the main control board is adjusting, and the indicating lamp for showing PASS status is on when the adjustment is done.

Further, the main control board is further connected to a personal computer which is used for printing display data and outputting orders to the main control board. The main control board sends the input voltages and output voltages obtained by sampling, and the voltage deviation values to the personal computer for display and storage, so that the tester can view them or submit operational orders.

The beneficial effect of the disclosure is that a voltage adjustment can be directly operated to the balance module, the error introduced by peripheral circuits is eliminated and the error of the final product are reduced with the precision of the components unchanged. The disclosure can not only improve the voltage accuracy, but also store a great quantity of test data so as to make statistics on the voltage bias of the balance module and supply the original basis for product upgrading and the effective utilization.

DETAILED DESCRIPTION OF THE DISCLOSURE

The disclosure is described in connection with specific embodiments, but the disclosure is not limited to these embodiments. It will be appreciated by those skilled in the art that the present disclosure encompasses all alternatives, modifications and equivalents that may be included within the scope of the claims.

Figure 1:
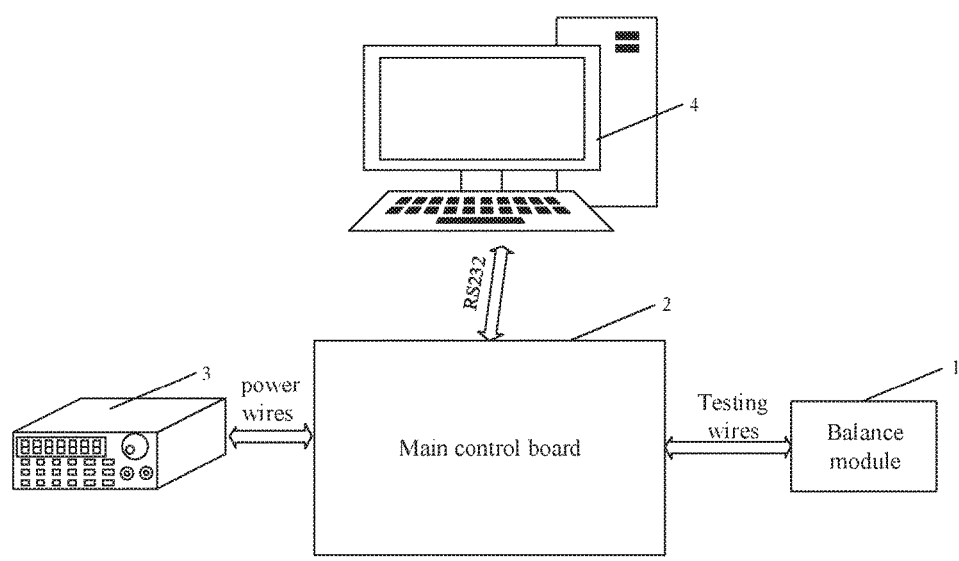
FIG. 1 is a schematic circuit diagram according to one embodiment of the present disclosure.
Figure 2:
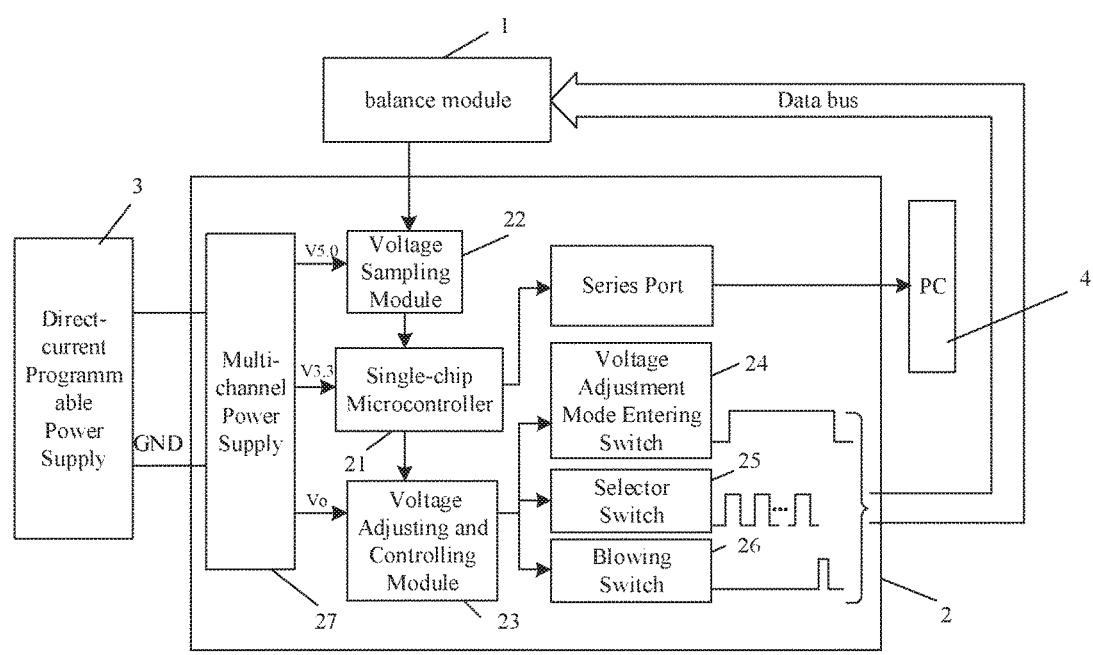
FIG. 2 is a detailed schematic diagram according to one embodiment of the present disclosure.
Figure 3:
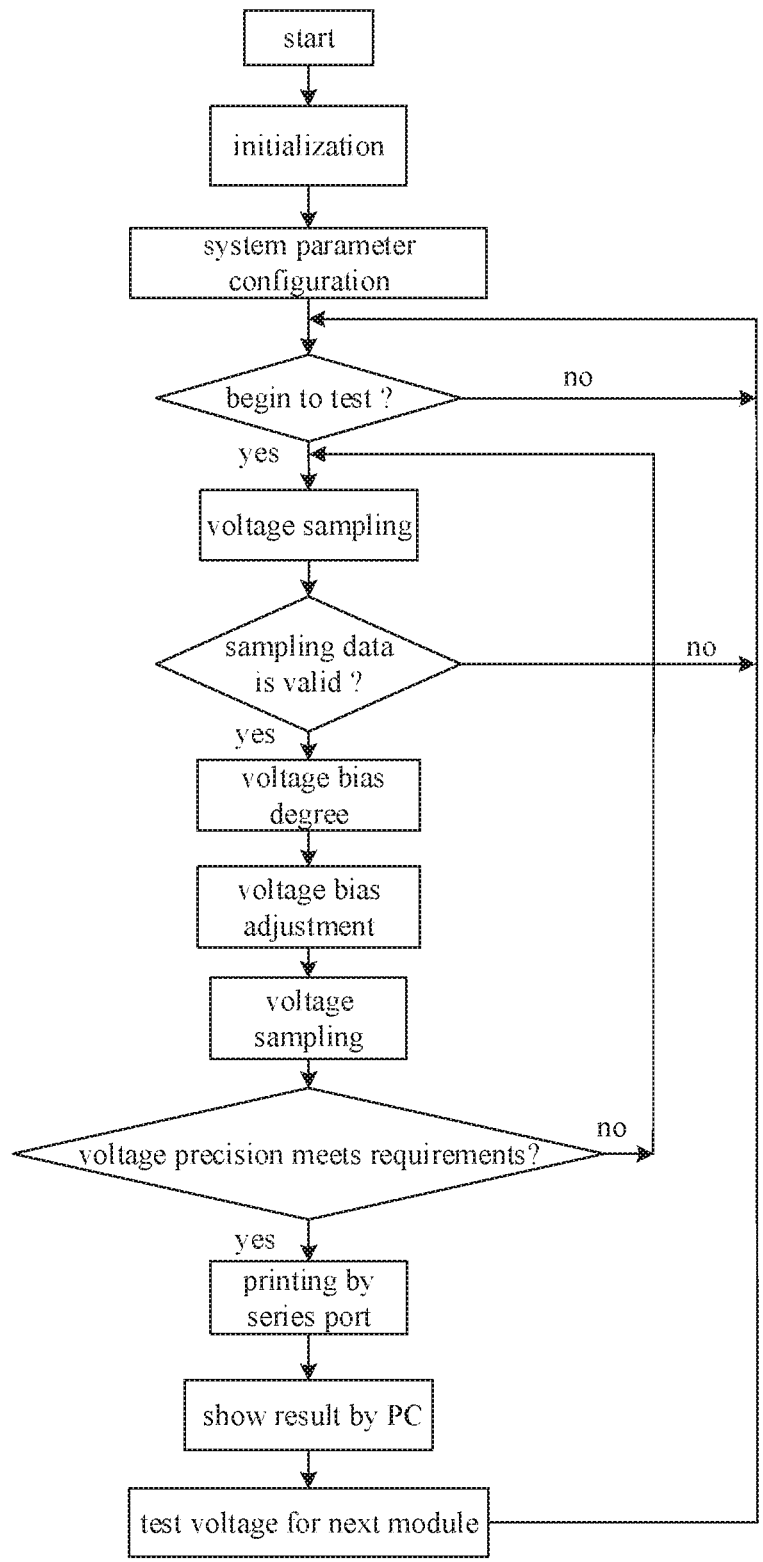
FIG. 3 is a work flow diagram according to one embodiment of the present disclosure.

As shown in FIG. 1 to 3, a voltage-deviation detecting and adjusting system for a balance module of a battery includes an adjusted balance module 1 connected to a main control board 2 which automatically adjusts voltage deviation of the output voltage from the balance module, a direct-current programmable power supply 3 for supplying electric energy is further connected on the main control board 2. The main control board 2 includes a single-chip microcontroller 21. The single-chip microcontroller 21 is connected to a voltage sampling module 22 for obtaining an input voltage and an output voltage of the balance module 1 by sampling and then outputting the input voltage and the output voltage to the single-chip microcontroller 21, a voltage adjusting module for adjusting the output voltage of the balance module 1 after a receipt of a signal of a voltage deviation value acquired by the single-chip microcontroller 21. After comparing the received input voltage and output voltage of the balance module 1 sampled by the voltage sampling module 22, the single-chip microcontroller 21 outputs the signal of the voltage deviation value to the voltage adjusting module, and the voltage adjusting module adjusts the output voltage of the balance module 1 to be consistent with the input voltage of the balance module 1 in accordance with the voltage deviation value. The balance module 1 has two operation manners, including an upward power transmission manner and a downward power transmission manner. The balance module 1 mainly balances the battery voltages of an upper battery unit and a lower battery unit, when the battery voltage of the upper battery unit is greater than the battery voltage of the lower battery unit, the balance module 1 operates under the downward power transmission manner, when the battery voltage of the lower battery unit is greater than the voltage of the upper battery unit, the balance module 1 operates under the upward power transmission manner. And the main control board 2 samples the voltages of the balance module 1 under different operation manners, the voltage deviation value is obtained by using corresponding calculation methods, and then the output voltage of the balance module 1 is adjusted in accordance with the voltage deviation value. In summary, the disclosure adjusts the output voltage of the balance module 1 directly by the main control board 2, to make the output voltage consistent with the input voltage, so that the errors introduced by the peripheral circuits can be eliminated and the error of the final product is reduced with the precision of the components unchanged.

Further, the balance module 1 is provided with a plurality of parallel boost fuses (not shown in FIGS.), each of which is used for increasing the output voltage after blown out and a plurality of parallel buck fuses (not shown in FIGS.), each of which is used for reducing the output voltage after blown out. For example, if the input voltage and the output voltage of the balance module 1 are equal to 3.30V and 3.34V respectively, the output voltage can be decreased to 3.28V by blowing out one of the plurality of the buck fuses in the balance module 1 and then be increased to 3.30V by blowing out one of the plurality of the boost fuses in the balance module 1. Each of the boost fuses corresponds to a different boost voltage value and each of the buck fuses corresponds to a different buck voltage value, both of which can be set based on the requirements.

The voltage adjusting module includes a voltage adjusting and controlling module 23 connected to the single-chip microcontroller 21, the voltage adjusting and controlling module 23 is connected to a voltage adjustment mode entering switch 24, a selector switch 25 and a blowing switch 26. The voltage adjustment mode entering switch 24 is controlled by the voltage adjusting and controlling module 23 to enable an adjusting mode, the selector switch 25 is controlled by the voltage adjusting and controlling module 23 to select one corresponding boost fuse or the buck fuse according to the voltage deviation value, and the blowing switch 26 is controlled by the voltage adjusting and controlling module 23 to output a blowing out signal to the balance module 1 for blowing out the corresponding fuses. After the voltage adjusting module receives the signal of the voltage deviation value from the single-chip microcontroller 21, the voltage adjusting and controlling module 23 turns the voltage adjustment mode entering switch 24 into an entry mode, and then a corresponding boost fuse or buck fuse is selected through the selector switch 25 in accordance with the signal of the voltage deviation value, and finally the blowing switch 26 outputs the blowing out signal to the balance module 1 for blowing out the fuse selected by the selector switch 25, so that the voltage deviation adjustment of the balance module 1 is realized.

The main control board 2 according to the embodiment further includes a multi-channel power supply 27 which is connected to the direct-current programmable power supply 3, the multi-channel power supply 27 is connected to the single-chip microcontroller 21, the voltage sampling module 22 and the voltage adjusting module, respectively.

The main control board 2 according to the embodiment further provides a dial switch (not shown) for selecting a type and one of the operation manners of the balance module 1, a plurality of indicating lamps (not shown) for showing operation statuses of the main control board and a buzzer for alarming (not shown).

Before the adjustment, the dial switch is used to select a type and one of the operation manners of the balance module 1. The indicating lamps are used to display the present operation status of the main control board.

When power is supplied normally, the indicating lamp for showing VCC status is on, when all the components are ready before operation, the indicating lamp for showing READY status is on, when the main control board is adjusting, the indicating lamp for showing BURNING status is on, and when the adjustment is done, the indicating lamp for showing PASS status is on.

Further, the main control board 2 according to the embodiment is further connected to a personal computer 4 which is used for printing display data and outputting orders to the main control board 2. The main control board 2 sends the input voltages and output voltages obtained by sampling, and the voltage deviation values to the personal computer 4 for display and storage, so that the tester can view them or submit operational orders.

When the system operates, it is necessary to set the type and the operation manner of the balance module through the dial switch before the main control board 2 is powered. When the main control board 2 is powered, the system starts to be initialized. After completely initialized, the system performs a parameter configuration and then enters a test mode, under which an external hardware button can control the voltage sampling and the personal computer 4 will print out the corresponding test results. After the data is determined to be valid, it is necessary to calculate a voltage deviation value for the balance module 1 under operation, and then the voltage deviation value is adjusted by controlling an optical coupler to output corresponding voltage level. Once the adjustment fails, the main control chip of the balance module 1 should be replaced, because the fuses cannot recovery once blown out and the voltage of the main control chip cannot be modified once the adjustment is finished.

The detail operation of the disclosure includes the following steps, 1. inputting a voltage, setting a different corresponding voltage and a limited current in accordance with the different balance module 1, when the power supply is turned on, the indicating lamp for showing VCC status is on for indicating the main control board 2 is powered normally;

2. connecting the wires of a test device to the main control board 2;

3. connecting an oscilloscope to the system for determining whether the system is working properly;

4. turning on a switch labeled B00T0 and a switch labeled DEBUG both in the dial switch, at which time the indicating lamp for showing READY status will be turned on to indicate the preparation is completed and the start of the test is being waited for;

5. placing the balance module 1 on the test device;

6. pressing the button START, at which time, the indicating lamp showing BURNING status will be turned on to indicate that the adjustment is running and the result of the adjustment will be printed to the personal computer through series port;

7. waiting for the test result;

8. informing that the adjust the balance module 1 is done successfully if the indicating lamp for showing PASS status is on and the buzzer is buzzing once, or informing that the adjustment of the present balance module 1 fails if the indicating lamp for showing Fail status is on and the buzzer is buzzing;

9. putting the balance module 1 which fails in adjustment into the module recycling collector to wait for a secondary process, and then processing the next balance module 1;

10. performing the test and the adjustment repeatedly from the step 5.

The invention claimed is:

1. A voltage-deviation detecting and adjusting system for a balance module of a battery, wherein said system comprises:

said balance module being adjusted and connected to a main control board which automatically adjusts voltage deviation of an output voltage adjusting from said balance module, a direct-current programmable power supply for supplying power is further connected on said main control board for automatically adjusting voltage deviation, wherein said main control board comprises a single-chip microcontroller, said single-chip microcontroller is connected with a voltage sampling module which is for obtaining an input voltage and an output voltage of said balance module by sampling and then outputting said input voltage and said output voltage to said single-chip microcontroller, and a voltage adjusting module for adjusting said output voltage of said balance module after receipt of an acquired signal of a voltage deviation value, wherein, after comparing said input voltage and said output voltage of said balance module sampled by said voltage sampling module, said single-chip microcontroller outputs said signal of said voltage deviation value to said voltage adjusting module, and said voltage adjusting module adjusts said output voltage of said balance module to be consistent with said input voltage of said balance module in accordance with said voltage deviation value.

2. The voltage-deviation detecting and adjusting system according to claim 1, wherein said balance module is provided with a plurality of boost fuses connected in parallel, each of which is used for increasing said output voltage after blown out, and a plurality of buck fuses connected in parallel, each of which is used for reducing said output voltage after blown out.

3. The voltage-deviation detecting and adjusting system according to claim 2, wherein said voltage adjusting module comprises a voltage adjusting and controlling module which is connected to said single-chip microcontroller, said voltage adjusting and controlling module is connected to a voltage adjustment mode entering switch, a selector switch and a blowing switch, said voltage adjustment mode entering switch is controlled by said voltage adjusting and controlling module to enable an adjusting mode, said selector switch is controlled by said voltage adjusting and controlling module to select respective one of said plurality of boost fuses or respective one of said plurality of buck fuses according to said voltage deviation value, and said blowing switch is controlled by said voltage adjusting and controlling module to output a blowing out signal to said balance module for blowing out respective one of said plurality of boost fuses and buck fuses.

4. The voltage-deviation detecting and adjusting system according to claim 1, wherein said main control board comprises a multi-channel power supply which is connected to said direct-current programmable power supply, said multi-channel power supply is connected to said single-chip microcontroller, said voltage sampling module and said voltage adjusting module, respectively.

5. The voltage-deviation detecting and adjusting system according to claim 1, wherein said main control board comprises a dial switch for selecting a type and an operation manner of said balance module, a plurality of indicating lamps for showing operation statuses of said main control board and a buzzer for alarming.

6. The voltage-deviation detecting and adjusting system according to claims 1, wherein a personal computer, which is used for printing display data and outputs orders to said main control board, is connected to said main control board.

* * * * *